United States Patent
Burns, Jr. et al.

(10) Patent No.: US 6,298,284 B1
(45) Date of Patent: Oct. 2, 2001

(54) APPARATUS AND METHOD WITH IMPROVED FIELD OF VIEW FOR DETERMINING VEHICLE WHEEL ALIGNMENT MEASUREMENTS FROM THREE DIMENSIONAL WHEEL POSITIONS AND ORIENTATIONS

(75) Inventors: Leigh R. Burns, Jr., Troy, IL (US); Timothy A. Strege, Ballwin, MO (US); Michael T. Stieff, Wentzville, MO (US); Daniel B. January, St. Peters, MO (US); Nicholas J. Colarelli, III, Creve Coeur, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 09/110,771

(22) Filed: Jul. 6, 1998

Related U.S. Application Data

(63) Continuation-in-part of application No. 08/859,477, filed on May 20, 1997, now Pat. No. 5,870,315, which is a continuation of application No. 08/651,766, filed on May 22, 1996, now Pat. No. 5,675,515, which is a continuation-in-part of application No. 08/580,465, filed on Dec. 28, 1995, now Pat. No. 5,724,128.

(51) Int. Cl.$^7$ .................................................. G01M 1/38
(52) U.S. Cl. ............................. 700/279; 700/57; 700/59; 356/139
(58) Field of Search .............................. 700/279, 57, 58, 700/59; 356/136.09, 152, 157; 702/95; 382/153; 33/203.18, 288

(56) References Cited

U.S. PATENT DOCUMENTS

| | | | |
|---|---|---|---|
| 4,319,838 | 3/1982 | Grossman et al. | 356/139 |
| 4,745,469 | 5/1988 | Waldecker et al. | 348/94 |
| 4,879,670 | 11/1989 | Colarelli, III | 348/94 |
| 4,899,218 | 2/1990 | Waldecker et al. | 356/139.09 |
| 5,488,472 | 1/1996 | January | 700/279 |
| 5,532,816 | * 7/1996 | Spann et al. | 356/139.09 |
| 5,583,797 | * 12/1996 | Fluegge et al. | 700/279 |
| 5,600,435 | * 2/1997 | Bartko et al. | 356/139.09 |
| 5,675,515 | 10/1997 | January | 700/279 |
| 5,724,128 | 3/1998 | January | 356/5.01 |
| 5,724,743 | * 3/1998 | Jackson | 33/288 |
| 5,943,783 | * 8/1999 | Jackson | 33/288 |

* cited by examiner

Primary Examiner—William Grant
Assistant Examiner—Kidest Bahta
(74) Attorney, Agent, or Firm—Polster, Lieder, Woodruff & Lucchesi, L.C.

(57) ABSTRACT

Apparatus and method for determining the alignment positions and orientations of vehicle wheels includes optical targets mounted on the wheels. A pair of cameras or other image sensing devices on each side of the vehicle are used to obtain images of the various optical targets and a computer is responsive to the images of the targets to determine values of wheel alignment parameters of the vehicle. The surface on which the wheels are disposed may be an automotive lift or a stationary runway. One camera on each side is directed at the target on the corresponding front wheel and the other camera on each side is directed at the target on the corresponding rear wheel. When used with a rack, the major axis of the field of view of each camera is disposed vertically. When used with a stationary runway, the major axis of the field of view of each camera is disposed horizontally.

33 Claims, 6 Drawing Sheets

WHEEL STEERED RIGHT 20°
WHEEL STEERED LEFT 20°

APPARATUS AND METHOD WITH IMPROVED FIELD OF VIEW FOR DETERMINING VEHICLE WHEEL ALIGNMENT MEASUREMENTS FROM THREE DIMENSIONAL WHEEL POSITIONS AND ORIENTATIONS

CROSS-REFERENCE TO RELATED APPLICATIONS

This application is a continuation-in-part of, and claims priority from, U.S. application Ser. No. 08/859,477, May 20, 1997, now U.S. Pat. No. 5,870,315 which is a continuation of application Ser. No. 08/651,766, May 22, 1996, U.S. Pat. No. 5,675,515, which is a continuation-in-part of U.S. application Ser. No. 08/580,465, Dec. 28, 1995, U.S. Pat. No. 5,724,128.

STATEMENT REGARDING FEDERALLY SPONSORED RESEARCH OR DEVELOPMENT

Not Applicable.

BACKGROUND OF THE INVENTION

The present invention relates to vehicle wheel alignment, and more particularly to vehicle wheel alignment systems which measure the locations and orientations of the vehicle wheels in a three dimensional coordinate system.

Various systems have been designed to determine vehicle wheel alignment angles. For example, U.S. Pat. No. Re 33,144 to Hunter and Jan. and U.S. Pat. No. 4,319,838 to Grossman and January each describe a wheel alignment system which uses electro-optical transducers to determine the toe alignment angles of a vehicle. FIG. 2 of each of these patents shows six angle transducers carried by support assemblies which are mounted to the vehicle wheels. FIG. 4 of U.S. Pat. No. Re 33,144 and FIG. 9 of U.S. Pat. No. 4,319,838 show the geometry of this arrangement and illustrate the six angles which are directly measured. These patents further describe (see U.S. Pat. No. Re 33,144 col. 7 lines 26–39, and U.S. Pat. No. 4,319,838 col. 8 line 63 to col. 9 line 12) how the toe alignment angles are computed from the angles directly measured by the angle transducers.

U.S. Pat. No. 4,879,670 to Colarelli describes a gravity-referenced inclinometer. FIG. 3 of U.S. Pat. No. 4,879,670 illustrates the mounting of such an inclinometer to a vehicle wheel for measuring the camber of the wheel. The use of gravity-referenced inclinometers to measure camber is conventional, and assumes the vehicle rests while being measured on a surface which is both flat and level.

SAE Publication 850219, titled "Steering Geometry and Caster Measurement", by January, derives and discusses the procedures and methods by which toe and camber alignment transducers are used to determine the caster and steering axis inclination (SAI) of a vehicle. The procedures described therein are the industry standard.

Equipment of this general type and using the apparatus and methods enumerated above has been used world-wide for many years. Such equipment is capable of determining the camber, caster, and pointing or "toe" alignment angles of the wheels relative to one or more appropriate reference axes, and is sufficient to allow proper adjustment of the alignment so as to reduce tire wear and provide for safe handling. It is believed, however, that such equipment could be improved.

U.S. Pat. No. 5,488,472 to January advances the art further by describing the use of conventional toe transducers which, while operating in cooperative pairs, have the additional capability of measuring the distances, each relative to the other. FIG. 7 of U.S. Pat. No. 5,488,472 illustrates the use of these "range and bearing" measurements to determine the coordinates and orientations of the sensors and wheels in a two dimensional coordinate system. The disclosure of the '472 patent is hereby incorporated herein by reference. A further description of the prior art may be found therein.

The disclosure of U.S. Pat. No. 5,488,472 illustrates that determining the two dimensional coordinates of the vehicle wheels does not provide greater ability to determine the toe alignments of the wheels relative to the appropriate reference axes of the vehicle. The only determinations of these reference axes which are practical to use are the same as those provided by transducers which measure angles but do not additionally measure distances.

U.S. Pat. Nos. 4,745,469 and 4,899,218, both to Waldecker et al., describe what is commonly known as an "external reference aligner". U.S. Pat. No. 4,899,218 is a continuation of U.S. Pat. No. 4,745,469, and contains no new disclosure. FIGS. 3 through 6 of these patents show how lasers are used to illuminate the tires and cameras are used to examine images of the sidewalls. These patents further describe how "machine vision techniques" are used to examine the images and determine the distances between the cameras and certain locations on the sidewalls, thereby allowing a determination of the locations and orientations of the wheels in a coordinate system which is relative to the cameras.

German Patent DE 29 48 573 A1, assigned to Siemens AG, describes the use of cameras to determine the locations and orientations of the wheels of a vehicle. On each side of the vehicle, a single camera is moved to multiple positions to view the vehicle wheels. Alternatively, a single fixed camera is used at each side in conjunction with movable mirrors, or multiple cameras are used. The system examines the images thus viewed of the wheels of the vehicle to determine the locations and orientations of the wheels, from which the wheel alignment parameters are determined.

European Patent Application PCT/US93/08333, filed in the name of Jackson and published under the Patent Cooperation Treaty as WO 94/05969 (hereinafter referred to as WO document 94/05969), describes the use of a camera having one or more defined fields of view to view optical targets of known configurations which are mounted to the vehicle wheels. Through the use of sophisticated image recognition methods, the three dimensional coordinates and orientations of the vehicle wheels and their corresponding axes of rotation are determined. The wheel alignment parameters are determined from these coordinates and orientations.

There exists a clear need for apparatus and methods which allow a proper determination of the alignment of the vehicle wheels.

In addition to the above-mentioned drawbacks, proper alignment using video systems is critically dependent upon accurate determination of the positions of the targets in the field of view.

It has been discovered that in prior art video alignment systems the brightness of the targets can vary from front to rear of the vehicle. This makes the proper determination of alignment angles even more difficult.

Furthermore, in prior art video alignment systems, the apparent size of the targets varies considerably from front to rear of the vehicle. This can result in reduced resolution for at least one set of wheels.

A further deficiency of prior art video alignment systems arises from the characteristics of lenses used in such systems. A lens cannot be adjusted to have the best possible focus on two separate objects when these objects are separated by some distance in depth unless they are both beyond the hyperfocal distance of the lens. Using a single lens, as in the prior art systems, requires the best focus point to be about ⅓ of the vehicle wheelbase beyond the front target. This means that both the front and rear targets have a slight blur as seen by the camera in prior art systems. In prior art video alignment systems, the resolution of the system is further limited by the need to retain the targets in the field of view of the cameras when the vehicle is raised on a lift rack. For example, at least one prior art system is believed to limit vertical movement of the vehicle to less than eighteen inches. This problem can be alleviated somewhat by making the cameras movable, but that introduces further complications and/or errors.

At least one prior art video alignment system mounts a pair of cameras on a beam disposed at eye height at the front of the vehicle. This results in a hazard for the technician doing the alignment, who must avoid hitting the beam with his or her head. In addition, this system includes lamps adjacent the cameras for illuminating the optical targets. Since the cameras and lamps are disposed so low, the light from the lamps may easily flash in the eyes of the technician with this prior art system.

In some instances, it may be desirable to perform a video alignment measurement of a vehicle in which the vehicle is not raised above ground level, but merely driven through a testing station. Present video alignment systems are not believed to be suitable for such a drive through operation.

SUMMARY OF THE INVENTION

Among the various objects and features of the present invention may be noted the provision of an improved video wheel alignment system.

A second object is the provision of such a system with improved resolution.

A third object is the provision of such a system which allows for substantial vertical movement of a vehicle in the field of view of the camera(s) so that the measurements thus determined are accurate.

A fourth object is the provision of a system which provides increased safety for the technician/user.

A fifth object is the provision of such a system which facilitates drive through operation.

A sixth object is the provision of such a system which is not as sensitive to brightness variations between targets.

Other objects and features will be in part apparent and in part pointed out hereinafter.

Briefly, a wheel alignment apparatus of the present invention determines the alignment of the wheels of a vehicle. The apparatus includes a set of predetermined optical targets adapted to be mounted to front and rear wheels of a vehicle, at least a first camera disposed to receive images of said optical target mounted to a front wheel of the vehicle, and at least a second camera disposed to receive images of said optical target mounted to a rear wheel of the vehicle, that rear wheel being disposed on the same side of the vehicle as that front wheel, each of the cameras having a field of view. The field of view of the first camera is directed at the optical target mounted to that front wheel of the vehicle and the field of view of the second camera is directed at the optical target mounted to that rear wheel of the vehicle. A computer is operatively connected to the cameras, and is responsive to the images of the targets to determine values of wheel alignment parameters of the vehicle.

In another aspect of the present invention, a wheel alignment station for determining the alignment of the wheels of a vehicle is provided. The station includes a predetermined path along which a vehicle whose wheel alignment is to be measured may be driven, which path has an entrance and an exit, the entrance and exit being spaced longitudinally along the predetermined path. The station also includes a set of predetermined optical targets adapted to be mounted to front and rear wheels of a vehicle to be driven along the predetermined path, at least a first camera disposed to receive images of said optical target mounted to a front wheel of the vehicle when said vehicle is at a predetermined position along the path, and at least a second camera disposed to receive images of said optical target mounted to a rear wheel of the vehicle when said vehicle is at a predetermined position along the path, the rear wheel being disposed on the same side of the vehicle as the front wheel. Each of the cameras has a field of view, the first camera having its field of view directed at the optical target mounted to the front wheel of the vehicle and the second camera having its field of view directed at the optical target mounted to the rear wheel of the vehicle when the vehicle is at the predetermined position along the path. A computer is operatively connected to the cameras and is responsive to the images of the targets to determine values of wheel alignment parameters of the vehicle.

BRIEF DESCRIPTION OF THE DRAWINGS

Similar reference characters indicate similar parts throughout the several views of the drawings.

DETAILED DESCRIPTION OF THE PREFERRED EMBODIMENT

It is preferred that the present invention be embodied in a computer controlled vehicle wheel alignment system, as is usual and customary in the art. Most modem wheel alignment systems are built using an off-the-shelf IBM compatible personal computer (PC) which is connected to the requisite alignment sensors through the built-in serial ports of the PC or through custom designed hardware.

As will be discussed in more detail presently, the sensors of the present invention consist of a pair of cameras or other image sensing devices which are made to view optical targets mounted to the vehicle wheels. This is very similar to WO document 94/05969 (discussed previously), the full disclosure of which is incorporated herein by reference. For purposes of the present invention, the term camera is used herein to refer to any such image sensing device.

Figure 1:
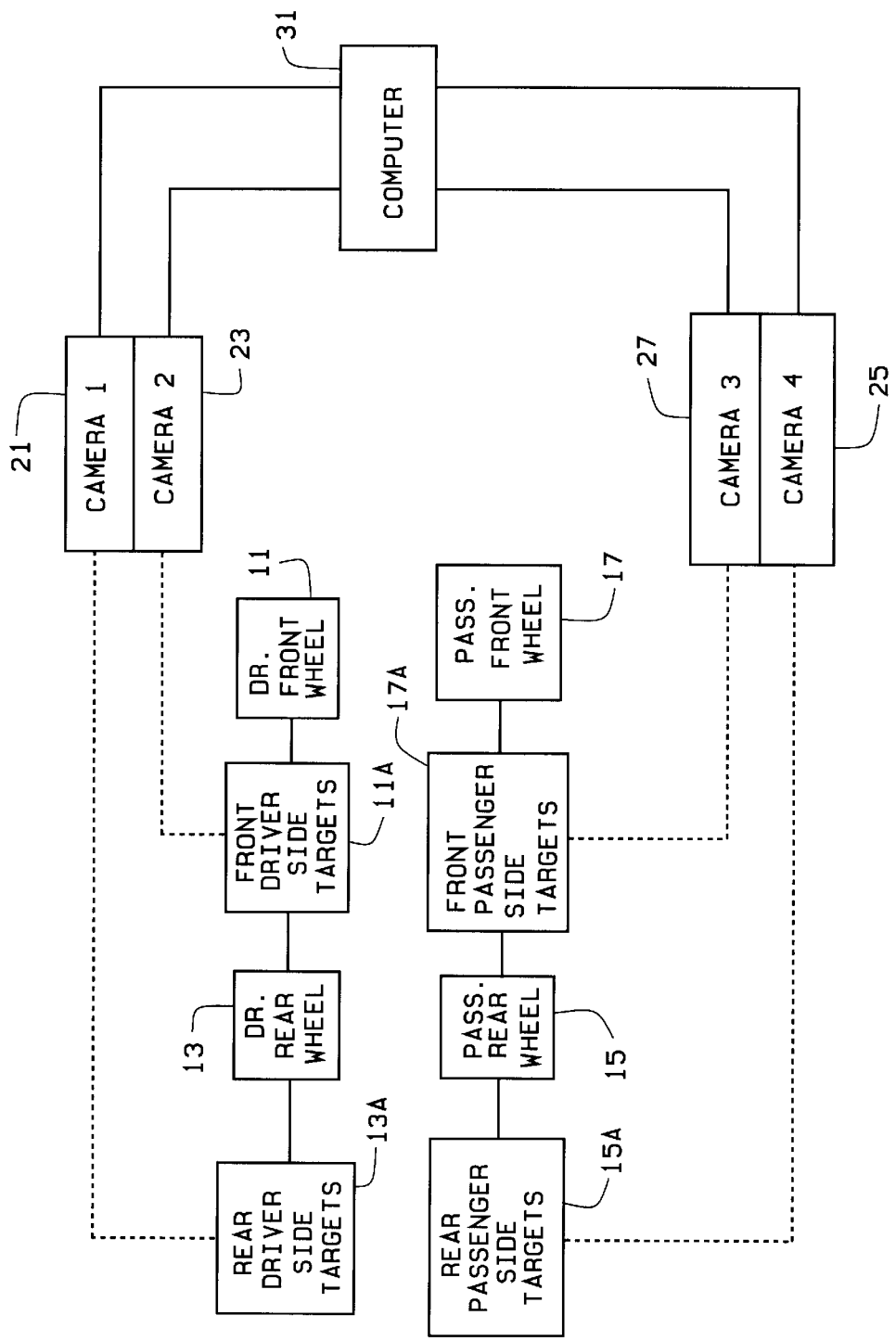
FIG. 1 a block diagram of a wheel alignment system of the present invention.

FIG. 1 illustrates the basic components of the system of the present invention which determines the coordinates and orientations of the vehicle wheels 11, 13, 15, 17, and the axes about which they roll. Each wheel has associated therewith one or more optical targets 11A, 13A, 15A, and 17A. The images of the targets are obtained in four cameras 21, 23, 25, 27, there being one camera for each wheel, for reasons which are explained below. The optical paths between the targets and the corresponding cameras are illustrated by dashed lines in FIG. 1. The signals from the cameras are supplied to a computer 31 where the images are processed to determine the various alignment angles. The process of calculating the alignment angles may be done in many ways, such as shown in U.S. Pat. No. 5,488,472, discussed above, and U.S. Pat. Nos. 5,870,315 5,675,515 and 5,724,128, the disclosures of which are incorporated herein by reference. It is preferred that the camera lens directed at the rear wheels have a longer focal length than the camera lens directed at the front wheels. Note that the use of two cameras with different focal lengths allows the best focus on both the front and rear wheels at the same time with no single lens compromise, unlike the prior art systems.

Figure 2:
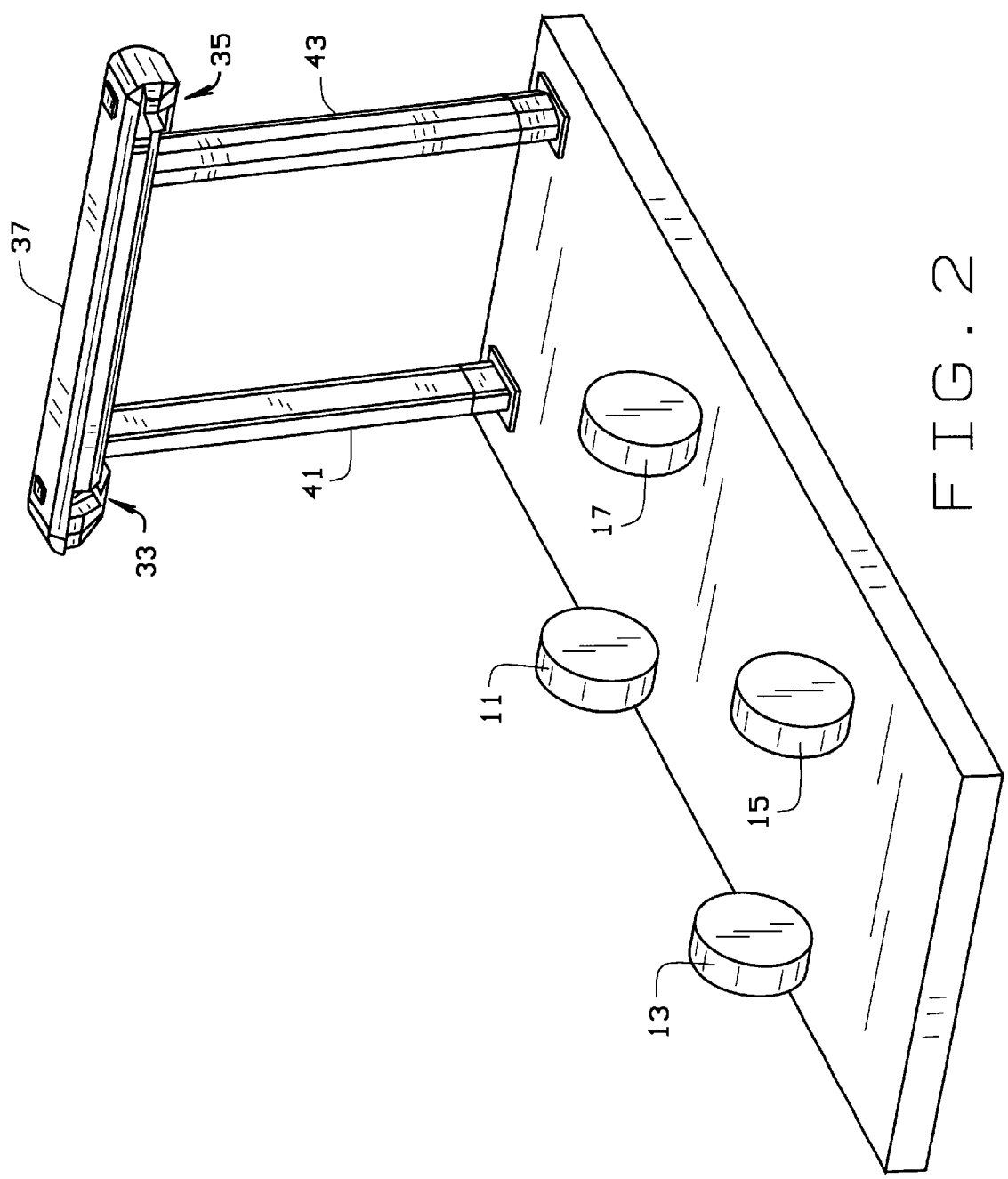
FIG. 2 is a simplified perspective view of a system of FIG. 1 which is particularly usable with a lift rack.

Turning to FIG. 2, it is preferred that the cameras (and any desired illumination devices) be disposed at spaced positions 33 and 35 in an elevated beam 37. Beam 37 is supported by two posts 41, 43 so that the cameras are at a preferred height of, for example, 84". The height is selected to allow a technician of average height to pass thereupon without bumping his head. In addition, the present system includes lamps adjacent the cameras for illuminating the optical targets. The height of the elevated beam keeps the light from the lamps from flashing in the eyes of the technician much better than with prior art systems. Note that with this system, if similar lamps are used to illuminate the front and rear targets, the brightness of those targets as measured at the respective cameras will differ because of the different path lengths from the lamps to the respective cameras. This difference in brightness as measured at the cameras is less of a problem with the present invention since each group of targets has its own camera so that the brightness, for a single camera, does not vary widely from target to target.

It is preferred that the two groups of cameras (disposed at 33 and 35 in FIG. 2) be separated by a substantial distance, such as 96". This allows wheels on both sides of a vehicle to be imaged for vehicles of a variety of widths. Although posts 41 and 43 are shown mounted in FIG. 2 on the same surface on which wheels 11, 13, 15, 17 rest, the system of the present invention may also be used when the wheels are disposed on a lift rack.

Figure 2A:
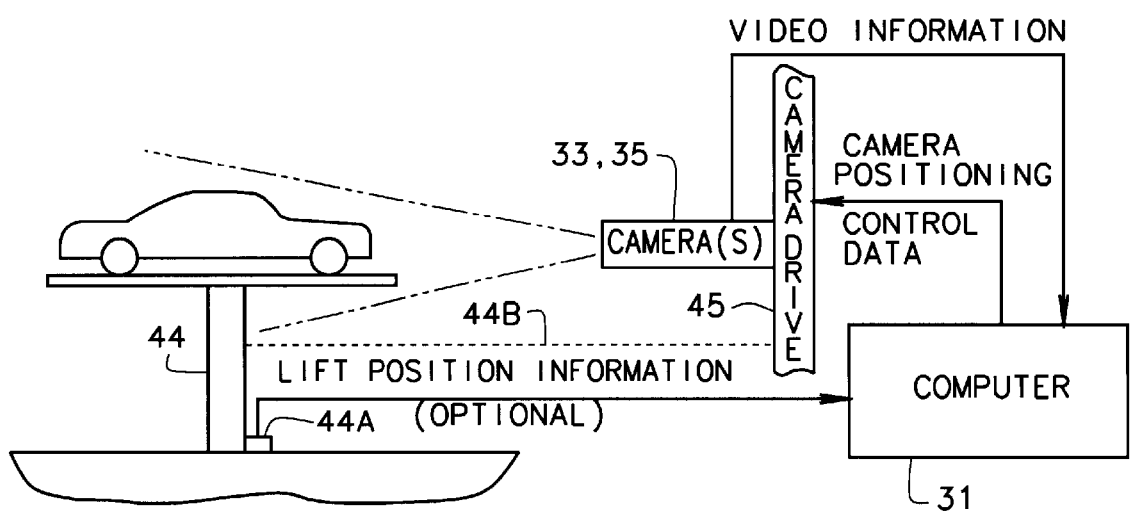
FIG. 2A is a diagrammatic view of the system of the present invention showing the interconnection of the various parts of the system.

When the vehicle wheels are disposed on a lift rack 44, as shown in FIG. 2A it is preferred that the cameras disposed at 33 and 35 be connected to a suitable elevating mechanism 45 so that the optical targets maintain their same position in the field of view of the cameras when the lift rack and vehicle are elevated. In this alternate embodiment, computer 31 is used to control the camera elevating mechanism so that as the automotive lift rack is raised, the cameras are raised the corresponding amount. (Of course, control mechanisms other than the computer 31 could be used as well). Many mechanisms are known for suitably elevating the cameras, such as hydraulic post systems, jack screws with motors, rack and pinion systems, and the like.

Camera position control can be exercised in a number of ways. For example, an optional lift position sensor 44A can be used to feed lift position information directly to computer 31, which in turn controls the camera elevating mechanisms to move the cameras a corresponding amount so that the targets remain in the same position in the field of view of the cameras. Alternatively, the cameras can be mechanically coupled to the elevating mechanism (indicated by dashed line 44B) such that the cameras are moved equal vertical distances by the elevating mechanism.

Similarly, computer 31 can be programmed to be responsive to the position of at least one target in the field of view to control the elevating mechanism to move the cameras so as to maintain that target at a predetermined position in the field of view. With this system, computer 31 can, by observing variation in the positions of the optical targets in the corresponding field of view, detect misalignment of the runways.

Although the present invention has been described in terms of keeping the fields of view of the cameras constant as the vehicle is elevated, it should be understood that in many instances the vehicle may be lowered to floor level from a standard 30" level to allow work to be done. It is anticipated that the present invention shall move the cameras correspondingly when the vehicle is lowered as well as when the vehicle is elevated.

Figure 2B:
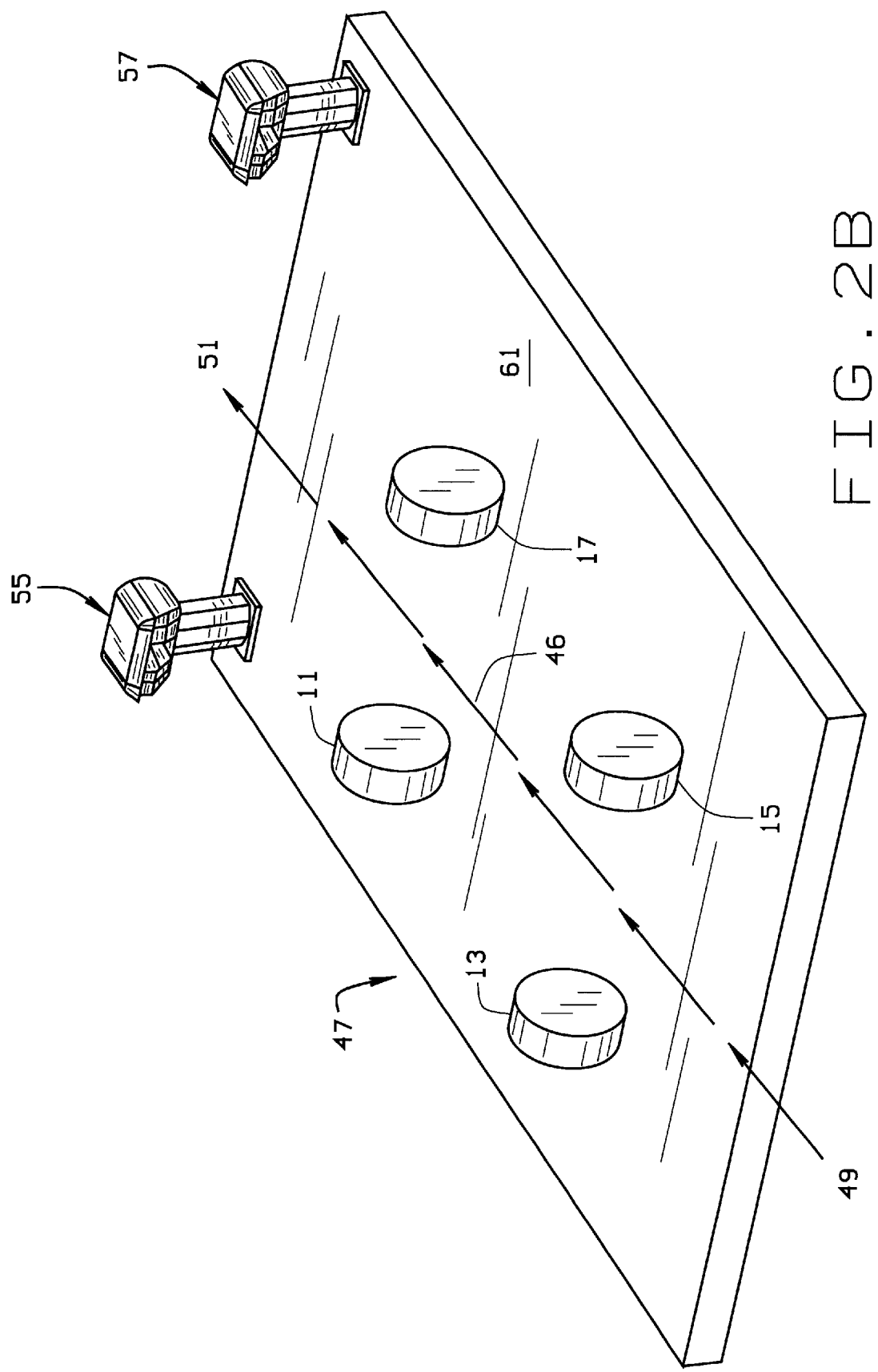
FIG. 2B is a simplified perspective view of a system of FIG. 1 which is particularly usable as a drive through system.

It is also contemplated that the present system may be used in a drive through manner as illustrated in FIG. 2B. There is preferably no lift rack in a drive through system. A drive through configuration is particularly useful for rapid auditing of the alignment measurements of vehicles or for facilities that prefer a pit to adjust the vehicle instead of a lift. The vehicle to be tested is driven along a predetermined path 46 through a testing station 47 from an entrance end 49 to an exit end 51, preferably stopping in the position indicated by wheels 11–17. Rather than use the post and beam construction of the system of FIG. 2, the drive through system has the cameras mounted on two posts 55, 57 mounted on opposite sides of the vehicle path. It is preferred that the cameras in this system be mounted at a substantially lower height such as approximately 20", and that the cameras on opposite sides of the vehicle be separated by a substantially larger distance such as 136".

Figure 3:
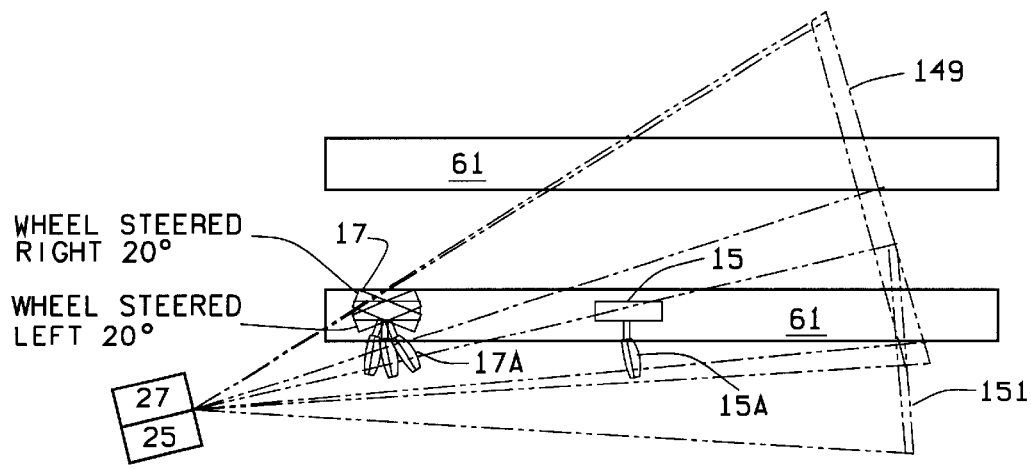
FIG. 3 is a schematic top plan view of the optical part of a wheel alignment system designed for drive-through operation.
Figure 3A:
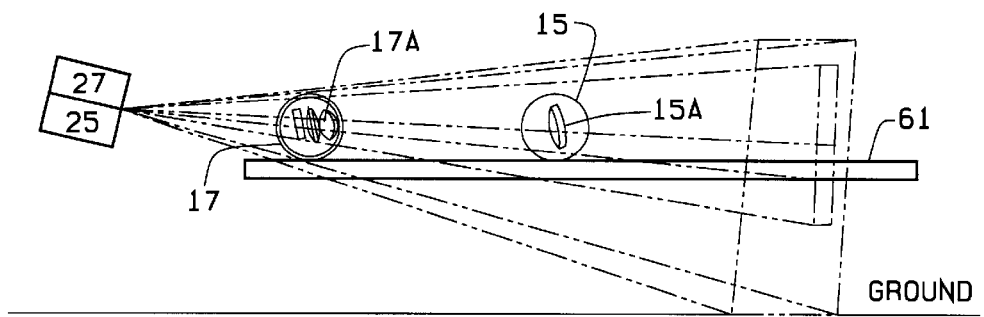
FIG. 3A is a schematic elevational view of the system of FIG. 3.

Turning to FIGS. 3 and 3A, there is shown the optical portions of an alignment system for use in a drive through application. In these figures, only cameras 25 and 27 are shown, although it should be realized that the illustration and description for the targets and cameras on the opposite side of the vehicle would be similar. Cameras 25 and 27 are disposed near ground level to the left side and slightly to the front of a runway 61 or floor on which the vehicle to be aligned is disposed. A similar set of cameras 21, 23 (not shown in these figures) are disposed near ground level to the right side and slightly to the front of runway 61. A set of predetermined optical targets 15A, 17A are mounted to front and rear wheels 15, 17 of the vehicle. Each of the cameras has a field of view with a major axis and a minor axis, the major axis of each being longer than the corresponding minor axis. For reference, the field of view of camera 27 is labeled 149, and the field of view of camera 25 is labeled 151. For example, the field of view of the front wheel cameras is 27 by 21 degrees, and the field of view of the rear wheel cameras is 16 by 12 degrees. Thus, the major axes of the two cameras (and the minor axes as well) are not, in general, equal. Although the fields of view of the cameras may be disposed with one of the axes disposed vertically, it is contemplated that one or more of the fields of view may be disposed diagonally (i.e., such that for a rectangular field of view, a diagonal of the rectangle is disposed vertically). In those instances in which the field of view of a camera is square, either axis may be chosen as the major axis and the other designated the minor axis. The square field of view is thus seen to be a special case in which the major axis and the minor axis of the field of view are equal.

The first camera 27 has its field of view focused on the optical target 17A mounted to said front wheel 17 of the vehicle and keeps the target in the field of view while the wheel is steered twenty degrees to the right and twenty degrees to the left or lock to lock on the vehicle. Similarly, the second camera 25 has its field of view focused on the optical target 15A mounted to the rear wheel 15 on the same side of the vehicle. By using two cameras focused separately on the two wheels, it is possible to get more resolution for each target 15A, 17A. The outputs of cameras 25, 27 are supplied to computer 31 which performs the necessary calculations from the images to determine alignment information.

In the embodiment of FIGS. 3 and 3A, the major axis of the field of view of at least camera 27 is shown as substantially horizontal. This configuration allows improved resolution when the vehicle is not raised during the alignment process.

Figure 4:
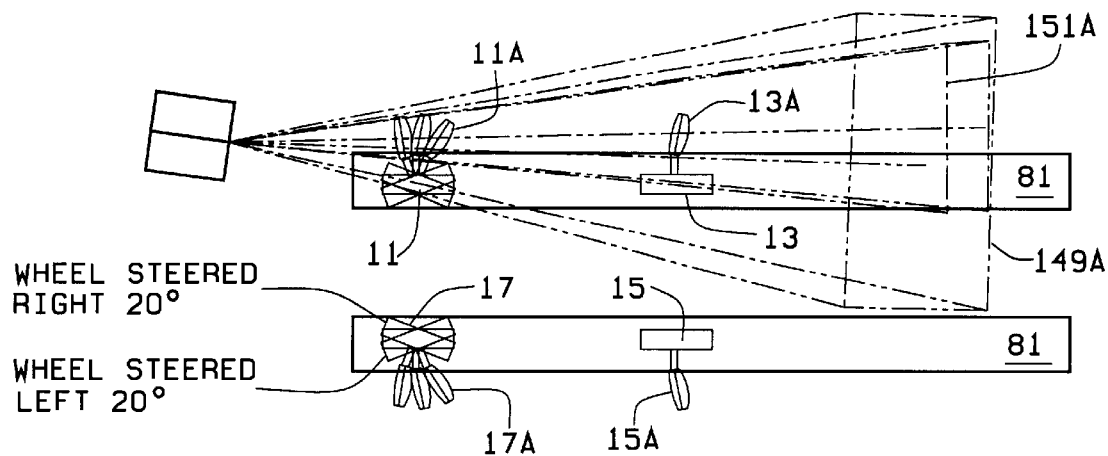
FIG. 4 is a schematic top plan view of the optical part of a wheel alignment system particularly useful with a lift rack.
Figure 4A:
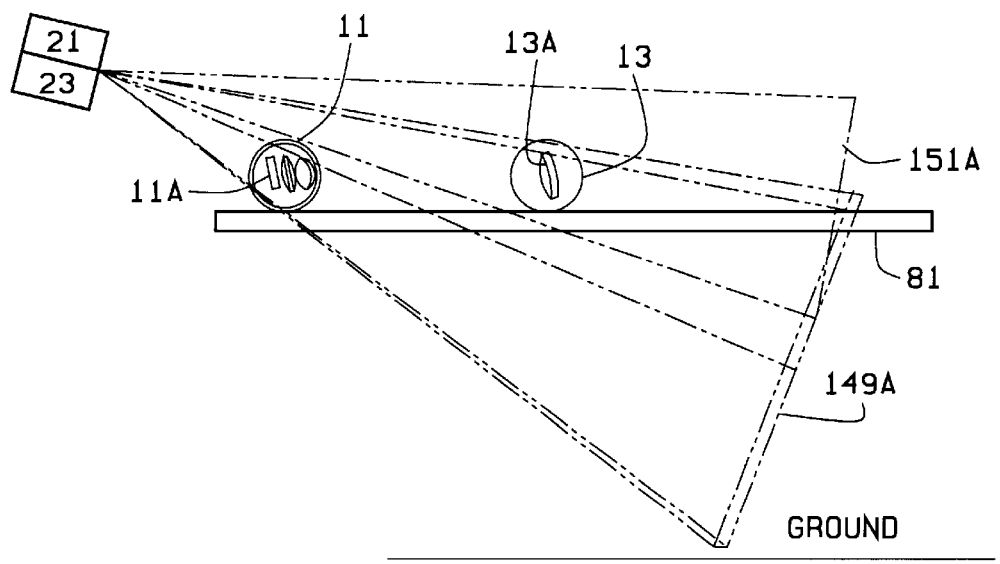
FIG. 4A is a schematic elevational view of the system of FIG. 4.

Turning to FIGS. 4 and 4A, the FIG. 2 embodiment of the invention is illustrated in a similar manner to that shown in FIGS. 3 and 3A for the FIG. 2B embodiment. This embodiment is particularly suited for use with a lift rack 81, although it is not limited to use with a lift rack. In this case, the basic arrangement is the same, but the major axes of the fields of view of all four cameras (only the right side cameras 21, 23 and their fields of view 149A and 151A are shown) are preferably disposed vertically. This configuration allows the targets to remain in their respective fields of view whether the vehicle is at the standard alignment height (typically 30" above the ground) or raised to a standard height greater than eighteen inches above the alignment height, for example, 48" above the ground. In this configuration, the cameras are mounted higher than in the FIG. 3 embodiment to allow a better view of the targets when the vehicle is raised.

In view of the above it will be seen that the various objects and features of the invention are achieved, and other advantageous results obtained. It should be understood that the description contained herein is illustrative only and is not to be taken in a limiting sense.

What is claimed is:

1. A wheel alignment apparatus for determining the alignment of the wheels of a vehicle, said apparatus comprising:
   a set of predetermined optical targets adapted to be mounted to front and rear wheels of a vehicle;
   at least a first camera disposed to receive images of said optical target mounted to a front wheel of the vehicle;
   at least a second camera disposed to receive images of said optical target mounted to a rear wheel of the vehicle, said rear wheel being disposed on the same side of the vehicle as said front wheel, each of said cameras having a field of view;
   the first camera having its field of view directed at the optical target mounted to said front wheel of the vehicle and the second camera having its field of view directed at the optical target mounted to said rear wheel of the vehicle;
   computing circuitry operatively connected to said cameras, said computing circuitry being responsive to the images of said targets to determine values of wheel alignment parameters of the vehicle.

2. The wheel alignment apparatus as set forth in claim 1 wherein the first camera has a field of view having a first major axis and a first minor axis, said second camera having a field of view having a second major axis and a second minor axis.

3. The wheel alignment apparatus as set forth in claim 2 wherein the major axis of the field of view of at least the first camera is substantially horizontal.

4. The wheel alignment apparatus as set forth in claim 3 wherein the first and second cameras are mounted near ground level.

5. The wheel alignment apparatus as set forth in claim 2 wherein the major axis of the field of view of at least the first camera is substantially vertical.

6. The wheel alignment apparatus as set forth in claim 5 wherein the first and second cameras are mounted substantially above ground level, said apparatus further including a rack for vertically elevating the vehicle, said first and second cameras being mounted at a position in which the targets of said front and rear wheels fall within the respective fields of view both when the rack is substantially at alignment height and when the rack is elevated to a predetermined height.

7. The wheel alignment apparatus as set forth in claim 1 further including third and fourth cameras disposed on the opposite side of the vehicle from the first and second cameras;
   said third camera disposed to receive images of said optical target mounted to a front wheel of the vehicle on the opposite side of the vehicle from the first and second cameras;
   said fourth camera disposed to receive images of said optical target mounted to a rear wheel of the vehicle on the opposite side of the vehicle from the first and second cameras, each of said cameras having a field of view;
   the third camera having its field of view directed at the optical target mounted to said front wheel of the vehicle on the opposite side of the vehicle from the first and second cameras, and the fourth camera having its field of view directed at the optical target mounted to said rear wheel of the vehicle on the opposite side of the vehicle from the first and second cameras.

8. The wheel alignment apparatus as set forth in claim 7 wherein the first and third cameras each have fields of view having a first major axis and a first minor axis, said second and fourth cameras each having a field of view having a second major axis and a second minor axis.

9. The wheel alignment apparatus as set forth in claim 8 wherein the major axes of at least the first and third cameras are disposed substantially horizontally.

10. The wheel alignment apparatus as set forth in claim 9 wherein all the cameras are mounted near ground level.

11. The wheel alignment apparatus as set forth in claim 8 wherein the major axes of at least the first and third cameras are disposed substantially vertically.

12. The wheel alignment apparatus as set forth in claim 11 wherein the cameras are mounted substantially above ground level, said apparatus further including a rack for vertically elevating the vehicle, said cameras being mounted at a position in which the targets of said front and rear wheels fall within the respective fields of view both when the rack is substantially at alignment height level and when the rack is elevated to a predetermined height.

13. The wheel alignment apparatus as set forth in claim 1 wherein the focal length of the second camera is longer than the focal length of the first camera.

14. The wheel alignment apparatus as set forth in claim 1 wherein the optical target on the front wheel has a different brightness measured at the first camera than the brightness of the optical target on the rear wheel measured at the second camera.

15. The wheel alignment apparatus as set forth in claim 1 further including a rack for vertically elevating the vehicle, said first and second cameras being mounted at a position in which the targets of said front and rear wheels fall within the respective fields of view both when the rack is substantially at alignment height and when the rack is elevated to a predetermined height greater than eighteen inches above alignment height.

16. The wheel alignment apparatus as set forth in claim 1 wherein the first and second cameras are disposed adjacent each other.

17. The wheel alignment apparatus as set forth in claim 1 the field of view of at least one of the cameras is generally rectangular in shape and is oriented diagonally with respect to the vertical direction.

18. The wheel alignment apparatus as set forth in claim 1 wherein the cameras are mounted at the front of a vehicle testing position, said cameras being mounted more than six feet high measured vertically.

19. A wheel alignment station for determining the alignment of the wheels of a vehicle, said station comprising:
    a predetermined path along which a vehicle whose wheel alignment is to be measured may be driven, said path having an entrance and an exit, the entrance and exit being spaced longitudinally along the predetermined path;
    a set of predetermined optical targets adapted to be mounted to front and rear wheels of a vehicle to be driven along the predetermined path;
    at least a first camera disposed to receive images of said optical target mounted to a front wheel of the vehicle when said vehicle is at a predetermined position along the path;
    at least a second camera disposed to receive images of said optical target mounted to a rear wheel of the vehicle when said vehicle is at a predetermined position along the path, said rear wheel being disposed on the same side of the vehicle as said front wheel, each of said cameras having a field of view;
    the first camera having its field of view directed at the optical target mounted to said front wheel of the vehicle and the second camera having its field of view directed at the optical target mounted to said rear wheel of the vehicle when the vehicle is at the predetermined position along the path;
    computing circuitry operatively connected to said cameras, said computing circuitry being responsive to the images of said targets to determine values of wheel alignment parameters of the vehicle.

20. The wheel alignment station as set forth in claim 19 wherein the first and second cameras are disposed adjacent each other.

21. The wheel alignment station as set forth in claim 19 wherein the first and second cameras are disposed to one side of the predetermined path.

22. A wheel alignment apparatus for determining the alignment of the wheels of a vehicle, said apparatus comprising:
    a set of predetermined optical targets adapted to be mounted in positions to provide images functionally related to wheel alignment parameters;
    at least one camera disposed to receive images of at least one optical target, said camera having a field of view;
    a computer operatively connected to said at least one camera, said computer being responsive to at least one image of at least one of said targets to determine values of wheel alignment parameters of the vehicle; and
    a mechanism to move said at least one camera such that at least one of said optical targets is present in the field of view at first and second positions of the target, said first and second positions of the target being separated vertically.

23. The wheel alignment apparatus as set forth in claim 22 further including a vertically movable surface on which the vehicle is disposed, said mechanism configured to place said at least one target in the field of view of said at least one camera in at least two different vertical positions.

24. The wheel alignment apparatus as set forth in claim 23 wherein the at least one camera includes at least first and second cameras, said first and second cameras being disposed on opposite sides of the vehicle.

25. The wheel alignment apparatus as set forth in claim 24 wherein the first and second cameras are disposed in a fixed geometric relationship.

26. The wheel alignment apparatus as set forth in claim 23 wherein the computer is responsive to the position of at least one target in the field of view to control the mechanism to move said camera so as to maintain said at least one target in the field of view.

27. The wheel alignment apparatus as set forth in claim 26 wherein said at least one camera includes at least first and second cameras disposed to view opposite sides of the vehicle, at least one optical target being in a field of view of the said first camera and at least one optical target being in a field of view of said second camera.

28. A wheel alignment apparatus for determining the alignment of the wheels of a vehicle, said apparatus comprising:
    a set of predetermined optical targets adapted to be mounted to wheels of a vehicle;
    at least one camera disposed to receive images of at least one of said optical targets, each of said at least one video cameras having a field of view;
    a computer responsive to at least one image of at least one of said targets to determine values of wheel alignment parameters of the vehicle; and
    a mechanism to alter the position of said at least one camera such that at least one of said targets is present in the field of view at first and second positions of the target, said first and second positions of the target being separated vertically.

29. The wheel alignment apparatus as set forth in claim 28 wherein the mechanism alters the position of said at least one camera such that said at least one optical target remains substantially in the same position in the field of view of said at least one camera.

30. The wheel alignment apparatus as set forth in claim 28 wherein the mechanism is responsive to vertical movement of said at least one target to automatically alter the vertical position of the field of view of said at least one camera.

31. A wheel alignment apparatus for determining the alignment of the wheels of a vehicle, said apparatus comprising:
    a set of predetermined optical targets adapted to be mounted to front and rear wheels of a vehicle;
    at least a first camera disposed to receive images of said optical target mounted to a front wheel of the vehicle;

at least a second camera disposed to receive images of said optical target mounted to a rear wheel of the vehicle, said rear wheel being disposed on the same side of the vehicle as said front wheel, each of said cameras having a field of view;

the first camera having its field of view directed at the optical target mounted to said front wheel of the vehicle and the second camera having its field of view directed at the optical target mounted to said rear wheel of the vehicle;

computing circuitry operatively connected to said cameras, said computing circuitry being responsive to the images of said targets to determine values of wheel alignment parameters of the vehicle; and a mechanism to move said first and second cameras.

32. The wheel alignment apparatus as set forth in claim 31 further including third and fourth cameras disposed on the opposite side of the vehicle from the first and second cameras;

said third camera disposed to receive images of said optical target mounted to a front wheel of the vehicle on the opposite side of the vehicle from the first and second cameras;

said fourth camera disposed to receive images of said optical target mounted to a rear wheel of the vehicle on the opposite side of the vehicle from the first and second cameras, each of said third and fourth cameras having a field of view;

the third camera having its field of view directed at the optical target mounted to said front wheel of the vehicle on the opposite side of the vehicle from the first and second cameras, and the fourth camera having its field of view directed at the optical target mounted to said rear wheel of the vehicle on the opposite side of the vehicle from the first and second cameras; and wherein said mechanism to move said first and second cameras is additionally configured to move said third and fourth cameras.

33. The wheel alignment apparatus as set forth in claim 32 further including a vertically movable surface on which the vehicle is disposed, said mechanism being responsive to vertical movement of said surface to maintain each of said optical targets in the fields of view of said first, second, third, and fourth cameras respectively.

\* \* \* \* \*